United States Patent
Im et al.

(10) Patent No.: US 8,530,089 B2
(45) Date of Patent: Sep. 10, 2013

(54) NEGATIVE ELECTRODE, LITHIUM BATTERY EMPLOYING THE SAME, AND METHOD OF PREPARING THE NEGATIVE ELECTRODE

(75) Inventors: Dong-min Im, Seoul (KR); Hun-joon Sohn, Seoul (KR); Jae-myung Lee, Seoul (KR); Won-seok Chang, Namyangju-si (KR); Hee-chul Jung, Gunpo-si (KR)

(73) Assignees: Samsung SDI Co., Ltd., Yongin-si, Gyeonggi-do (KR); SNU R&DB Foundation, Seoul (KR)

( * ) Notice: Subject to any disclaimer, the term of this patent is extended or adjusted under 35 U.S.C. 154(b) by 199 days.

(21) Appl. No.: 12/853,560

(22) Filed: Aug. 10, 2010

(65) Prior Publication Data

US 2011/0206987 A1 Aug. 25, 2011

(30) Foreign Application Priority Data

Feb. 22, 2010 (KR) .................. 10-2010-0015807

(51) Int. Cl.
*H01M 4/00* (2006.01)
(52) U.S. Cl.
USPC ........... 429/220; 429/221; 429/223; 429/226; 429/231.4; 429/231.8; 429/231.95
(58) Field of Classification Search
USPC ........... 429/223, 220, 221, 226, 231.3, 231.4, 429/231.8, 231.95
See application file for complete search history.

(56) References Cited

U.S. PATENT DOCUMENTS

| 6,203,944 B1 | 3/2001 | Turner et al. |
| 2002/0015889 A1* | 2/2002 | Yamamoto et al. ...... 429/231.95 |
| 2003/0148185 A1* | 8/2003 | Kusumoto et al. ............ 429/233 |
| 2006/0051675 A1 | 3/2006 | Musha et al. |
| 2006/0115735 A1 | 6/2006 | Yasuda et al. |
| 2006/0204845 A1* | 9/2006 | Chang et al. .................. 429/209 |
| 2009/0197176 A1* | 8/2009 | Kim et al. .................. 429/231.5 |

FOREIGN PATENT DOCUMENTS

| JP | 2002-110152 | 4/2002 |
| KR | 10-0659814 | 12/2006 |
| KR | 10-0680650 | 2/2007 |
| KR | 10-2007-0069306 | 7/2007 |

OTHER PUBLICATIONS

Mao et al.' "Active/Inactive Nanocomposites as Anodes for Li-Ion Batteries", 1999 (no month, available electronically Oct. 1998), Electrochemical and Solid State Letters, 2 (1), pp. 3-5.*

Idota et al., Tin-Based Amorphous Oxide: A High-Capacity Lithium-Ion-Storage Material, Science, vol. 276, May 30, 1997.

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A negative electrode, a lithium battery employing the negative electrode, and a method of preparing the negative electrode. The negative electrode includes a current collector, and a negative electrode active material layer disposed on the current collector. The negative electrode active material layer includes: composite negative electrode active material particles comprising tin (Sn), and conductive metal particles. The conductive metal particles form an intermetallic compound with the Sn, and an average particle size of the conductive metal particles is at least 10 μm.

17 Claims, 1 Drawing Sheet

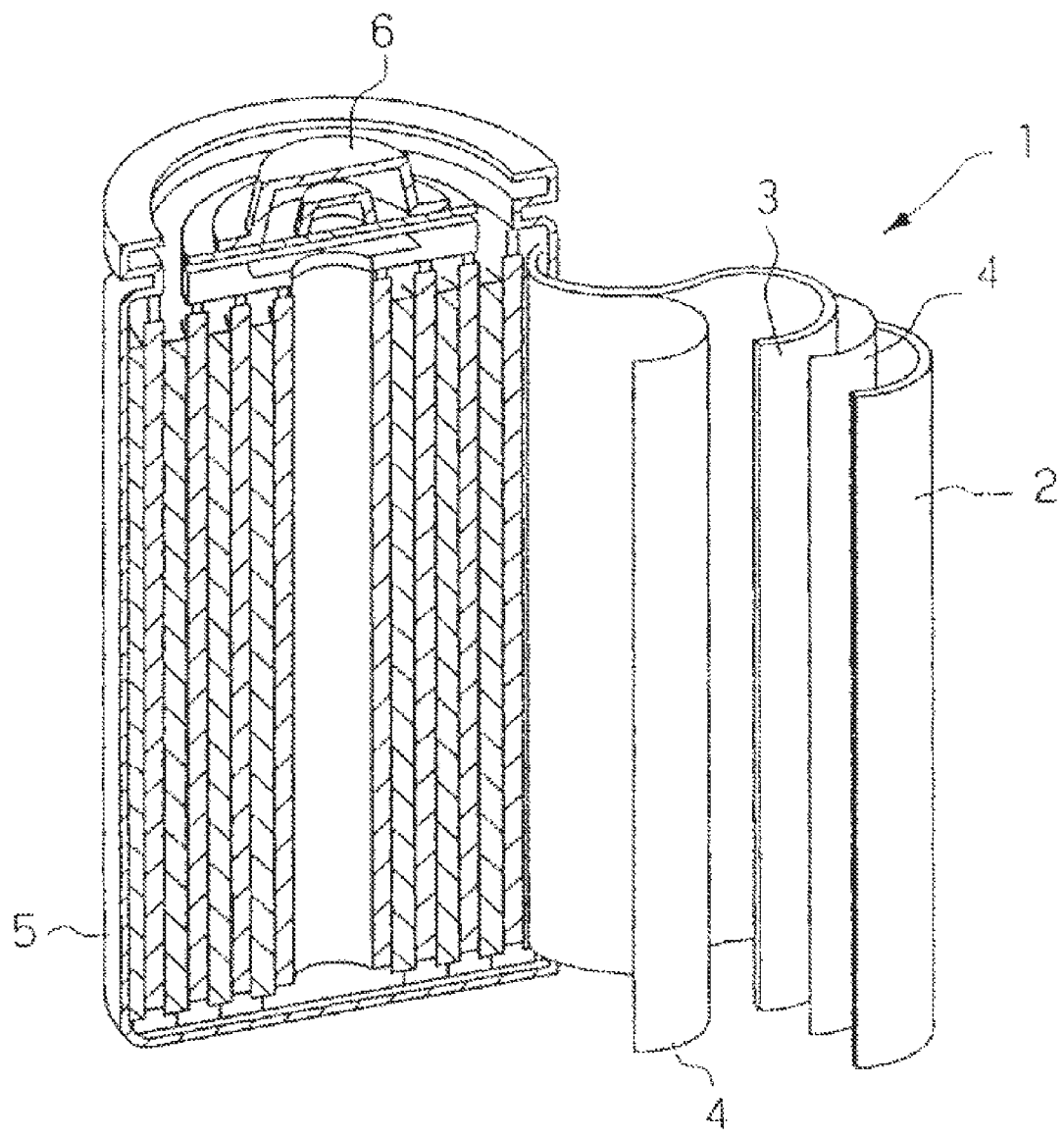

NEGATIVE ELECTRODE, LITHIUM BATTERY EMPLOYING THE SAME, AND METHOD OF PREPARING THE NEGATIVE ELECTRODE

CROSS-REFERENCE TO RELATED APPLICATIONS

This application claims the benefit of Korean Patent Application No. 10-2010-0015807, filed on Feb. 22, 2010, in the Korean Intellectual Property Office, the disclosure of which is incorporated herein in its entirety, by reference.

BACKGROUND

1. Field

The present disclosure relates to negative electrodes, lithium batteries employing the negative electrodes, and methods of preparing the negative electrodes.

2. Description of the Related Art

An example of a negative electrode active material for a lithium battery is a carbon-based material, such as graphite. Graphite has excellent capacity retention and electric potential. A battery including graphite is stable, since the volume of the graphite does not change significantly in the process of lithiation and delithiation. However, the theoretical electric capacity of the graphite is limited to only about 372 mAh/g.

A metal alloyable with lithium may be used as a negative electrode active material having a higher electric capacity than the graphite or other carbon-based material. Examples of the metal alloyable with lithium include silicon (Si), tin (Sn), and aluminum (Al). The metal alloyable with lithium should have a very large electric capacity. When such a metal is charged and discharged, the volume of the metal expands and contracts, thereby isolating an active material in an electrode and accelerating an electrolyte decomposition reaction, according to an increase in the specific surface area thereof. A lithium battery including the metal has a low capacity retention. For example, when Sn is repeatedly charged and discharged, particles of Sn are repeatedly aggregated and crushed, and thus, the particles of Sn are electrically disconnected.

Accordingly, a method of preparing a lithium battery, including a high capacity metal alloyable with lithium, but still having excellent capacity retention, is needed.

SUMMARY

Provided are negative electrodes including conductive metal particles.

Provided are lithium batteries employing the negative electrodes.

Provided are methods of preparing the negative electrodes.

According to an aspect of the present invention, a negative electrode includes: a current collector; and a negative electrode active material layer disposed on the current collector. The negative electrode active material layer includes: composite negative electrode active material particles comprising tin (Sn); and conductive metal particles. The conductive metal particles may form an intermetallic compound with the Sn, and an average particle size of the conductive metal particles is at least 10 μm.

According to another aspect of the present invention, a lithium battery employing the negative electrode is provided.

According to another aspect of the present invention, a method of preparing a negative electrode is provided, the method including mixing composite negative electrode active material particles comprising tin (Sn) with conductive metal particles, wherein an average particle size of the conductive metal particles is at least 10 μm.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a diagram schematically illustrating a lithium battery according to an embodiment of the present invention.

DETAILED DESCRIPTION

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

A negative electrode, according to an exemplary embodiment of the present invention, includes a current collector and a negative electrode active material layer disposed on the current collector. The negative electrode active material layer includes composite negative electrode active material particles including tin (Sn), and conductive metal particles. The conductive metal may form an intermetallic compound with the Sn. The intermetallic compound is externally exposed from the composite negative electrode active material particles, during charging and discharging. An average particle size of the conducive metal particles may be at least 10 μm. Accordingly, aggregation of the Sn may be suppressed, even when a lithium battery including the negative electrode is repeatedly charged and discharged, over a long period of time.

When the average particle size of the conductive metal particles is too small, a specific surface area of the conductive metal particles may increase, thereby increasing an electrolyte decomposition amount. On the other hand, when the average particle size of the conductive metal particles is too large, it may be difficult to prepare the negative electrode. For example, when the average particle size of the conductive metal particles is less than about 10 μm, the capacity retention ratio of the lithium battery may deteriorate.

For example, the average particle size of the conductive metal particles may be in the range of 10 to 100 μm. For example, the average particle size of the conductive metal particle may be in the range of 10 to 80 μm.

The conductive metal in the negative electrode may be at least one metal selected from the group consisting of copper (Cu), nickel (Ni), cobalt (Co), and iron (Fe). For example, the conductive metal may be Cu.

The composite negative electrode active material in the negative electrode may further include at least one material selected from the group consisting of carbon and a transition metal other than Sn. The transition metal may be at least one metal selected from the group consisting of Fe, Co, Ni, Cu, titanium (Ti), vanadium (V), niobium (Nb), molybdenum (Mo), antimony (Sb), and tungsten (W), for example.

For example, the composite negative electrode active material may be at least one material selected from the group consisting of Sn—C, Sn-M, and Sn-M-C, wherein M is a transition metal other than Sn. For example, the composite negative electrode active material may be at least one material selected from the group consisting of $Sn_2Fe$, $Sn_2Fe$—C, $Sn_2Co$, $Sn_2Co$—C, $Sn_2Mn$, $Sn_2Ni_3$, $Sn_4Ni_3$, SnSb, and $Sn_3Sb_2$.

A weight ratio of the composite negative electrode active material particles to the conductive metal particles included in the negative electrode active material layer, i.e., the composite negative electrode active material particles:conductive metal particles, may be in the range of about 95:5 to 70:30.

A lithium battery according to an exemplary embodiment of the present invention includes the negative electrode. The lithium battery may be prepared as follows.

First, the negative electrode is prepared. For example, composite negative electrode active material particles including tin (Sn), conductive metal particles having an average particle size of at least 10 μm, a conducting agent, a binder, and a solvent are mixed, to prepare an negative electrode active material composition. The negative electrode active material composition is directly coated on a copper current collector, to prepare a negative electrode plate. Alternatively, the negative electrode material composition may be cast on a separate support, and then a negative electrode active material film exfoliated from the support is laminated on the copper current collector, to prepare a negative electrode plate. The amounts of the negative electrode active material, the conducting agent, the binder, and the solvent are the same as those commonly used in a lithium battery.

The conducting agent, the binder and the solvent in the negative electrode active material composition are the same as those in a cathode active material composition below. In some cases, a plasticizer may be added to the cathode active material composition and/or the negative electrode active material composition, to produce pores inside the electrode plates.

Then, a positive electrode active material composition is prepared by mixing a positive electrode active material, a conductive material, a binding material, and a solvent. The positive electrode active material composition is directly coated and dried on a metal current collector, so as to prepare a positive electrode plate. Alternatively, the positive electrode active material composition may be cast on a separate support, and then a film detached from the support may be laminated on the metal collector, so as to prepare the positive electrode plate.

The positive electrode active material is a compound to and from which lithium may be intercalated and deintercalated. Any well known positive electrode active material may be used. For example, $LiCoO_2$, $LiMn_xO_{2x}$ (x=1, 2), $LiNi_{1-x}M-n_xO_2$ (0<x<1), $LiNi_{1-x-y}CO_xMn_yO_2$ (0≦x≦0.5, 0≦y≦0.5), $LiFeO_2$, $V_2O_5$, TiS, and MoS may be used as the positive electrode active material.

Examples of the conductive material include carbon black, graphite particles, etc, but are not limited thereto. Any conductive material that is used in the related art may be used.

Examples of the binding material include vinylidene fluoride/hexafluoropropylene copolymer, polyvinylidenefluoride (PVDF), polyacrylonitrile, polymethylmethacrylate, polytetrafluoroethylene, and mixtures thereof, and styrene butadiene rubber-based polymer, but are not limited thereto. Any binding material that is used in the related art may be used.

Examples of the solvent include N-methylpyrrolidone (NMP), acetone, and water, but are not limited thereto. Any solvent that is used in the related art may be used.

Amounts of the positive electrode active material, the conductive material, the binding material, and the solvent are amounts generally used in a lithium battery. At least one of the conductive material, the binding material, and the solvent may not be used, according to a use and composition of the lithium battery.

Next, a separator is inserted between the positive electrode and the negative electrode. Any separator that is generally used in a lithium battery may be used. The separator may have low resistance with respect to ion movement of an electrolyte and an excellent electrolyte absorbing ability. For example, the separator may be selected from the group consisting of glass fiber, polyester, Teflon, polyethylene, polypropylene, polytetrafluoroethylene (PTFE), and mixtures thereof, and may be a nonwoven fabric or a woven fabric. For example, a lithium ion battery may use a rollable separator, such as polyethylene or polypropylene. For example, a lithium ion polymer battery may use a separator having an excellent organic electrolyte retaining ability. The separator may be prepared as follows.

A separator composition is prepared by mixing a polymer resin, a filler, and a solvent. The separator may be formed by directly coating and drying the separator composition on the top of an electrode. Alternatively, the separator may be formed by casting and drying the separator composition on a support, and then laminating a separator film detached from the support onto the electrode.

The polymer resin used to prepare the separator composition is not specifically limited, and any material used as a binding material of an electrode plate may be used. For example, vinylidene fluoride/hexafluoropropylene copolymer, PVDF, polyacrylonitrile, polymethylmethacrylate, or a mixture thereof, may be used.

Then, an electrolyte is prepared. The electrolyte may be in a liquid or gel form. For example, the electrolyte may be an organic electrolyte solution. Alternatively, the electrolyte may be solid. Examples of the solid electrolyte include boron oxide, lithium oxynitride, etc, but are not limited thereto, and any electrolyte that is used as a solid electrolyte in the related art may be used. The solid electrolyte may be formed on the negative electrode, by using a method such as sputtering.

Here, an organic electrolytic may be prepared. The organic electrolytic solution is prepared by dissolving lithium salt in an organic solvent.

Any organic solvent used in the related art may be used. Examples of the organic solvent include propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethan, sulforane, dichloroethane, chlorobenzene, nitrobenzene, dimethylcarbonate, methylisopropylcarbonate, ethylpropylcarbonate, dipropylcarbonate, dibutylcarbonate, diethyleneglycol, dimethyleter, and mixtures thereof.

Any lithium salt that is used in the related art may be used. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO2)(C_yF_{2y+1}SO_2)$ (where x and y are each a natural number), LiCl, LiI, and mixtures thereof.

FIG. 1 is a diagram schematically illustrating a lithium battery 1, according to an ex embodiment of the present invention. As shown in FIG. 1, the lithium battery 1 includes a positive electrode 3, a negative electrode 2, and a separator 4. The positive electrode 3, the negative electrode 2, and the separator 4 are wound or folded to be accommodated in a battery case 5. Next, an organic electrolyte is injected into the battery case 5, and the battery case 5 is sealed by a cap assembly 6, so as to complete the lithium battery 1. The battery case 5 may have a cylindrical shape, a prismatic shape, a thin film shape, or the like. For example, the lithium battery 1 may be a thin film-type battery. The lithium battery may be a lithium ion battery.

A battery assembly may be formed by disposing the separator 4 between the positive electrode 3 and the negative electrode 2. A lithium ion polymer battery may be prepared by stacking the battery assemblies in a bi-cell structure, impregnating the battery assemblies in an organic electrolyte, accommodating and sealing the resulting product in a pouch.

Also, the plurality of the battery assemblies may be stacked to form a battery pack. Such a battery pack may be used in any device that requires high capacity and high output. For example, the battery pack may be used in a laptop, a smart phone, or an electric vehicle.

A method of preparing a negative electrode, according to an exemplary embodiment of the present invention, includes mixing composite negative electrode active material particles including Sn with conductive metal particles. A method of mixing the composite negative electrode active material particles with the conductive metal particles is not specifically limited, and any method generally used in the related art may be used. For example, a mechanical mixing method may be used.

In the method, the average particle size of the conductive metal particles may be at least 10 μm. When the average particle size of the conductive metal particle is less than 10 μm, the capacity retention ratio of a lithium battery including the negative electrode may be reduced. For example, the average particle size of the conductive metal particle may be in the range of 10 to 100 μm. For example, the average particle size of the conductive metal particle may be in the range of 10 to 80 μm.

In the method, the conductive metal may be at least one metal selected from the group consisting of Cu, Ni, Co, and Fe. For example, the conductive metal may be Cu.

In the method, the composite negative electrode active material may be at least one material selected from the group consisting of Sn—C, Sn-M, and Sn-M-C, wherein M is a transition metal excluding Sn. For example, the composite negative electrode active material may be at least one material selected from the group consisting of $Sn_2Fe$, $Sn_2Fe$—C, $Sn_2Fe$, $Sn_2Fe$—C, $Sn_2Co$, $Sn_2Co$—C, $Sn_2Mn$, $Sn_2Ni_3$, $Sn_4Ni_3$, SnSb, and $Sn_3Sb_2$.

In the method, the Sn-M-C may be prepared by mechanically milling a Sn-M composite with a carbon-based material, for 40 hours or less. For example, the milling time may be in the range of 10 to 40 hours. For example, the milling time may be in the range of 15 to 25 hours. A stirring speed during the mechanical milling may be in the range of 300 to 700 rpm. For example, the stirring speed may be in the range of 450 to 650 rpm.

In the method, the Sn-M composite may be prepared by mixing a Sn powder and an M powder, and heat treating the mixture in an inert atmosphere, for 5 to 20 hours. The M powder may be Fe powder, and an average particle size of the Fe powder may be in the range of 3 to 5 μm. For example, the average particle size of the Fe powder may be 4 μm.

In the method, a single-phase Sn-M composite powder may be prepared by mixing the Sn powder and M powder, and then thermal-processing the mixture in an argon atmosphere, for 12 hours at 450° C. The Sn-M composite powder is mixed with a carbon-based material, and then the resulting product is mechanically milled in an inert atmosphere for 10 to 40 hours, at 400 to 700 rpm, thereby preparing a composite negative electrode active material. Next, the composite negative electrode active material powder and Cu powder may be mechanically stirred for 10 to 60 minutes, to prepare a mixed powder. The mixed powder may be further mixed with a conductive material, a binder, a solvent, or the like, to prepare a slurry. A negative electrode may be prepared by coating and drying the slurry on a current collector.

The present invention will be described in greater detail with reference to the following examples. The following examples are for illustrative purposes only and are not intended to limit the scope of the invention.

Preparation of Composite Negative Electrode Active Material

Preparation Example 1

A single-phase $Sn_2Fe$ powder was obtained by mixing Sn powder (99%, Aldrich, USA) having an average particle size of 10 μm and Fe powder (99.9%, Kojundo Chemical Laboratory, Japan) having an average particle size in the range of 3 to 5 μm, in a mole ratio of 2:1, and then thermal-processing the mixture in an argon atmosphere for 12 hours at 450° C.

A composite negative electrode active material was prepared by mixing 1.8 g (60 wt %) of the $Sn_2Fe$ powder and 1.20 g (40 wt %) of carbon black (SuperP, MMM carbon, Belgium) powder, and then mechanically milling the mixture in an argon atmosphere for 40 hours, at 500 rpm, using a self-manufactured shaker-type ball mill.

Preparation Example 2

Single-phase $Sn_2Fe$ powder was obtained in the same manner as in Preparation Example 1.

A composite negative electrode active material was prepared by mixing 2.55 g (85 wt %) of the $Sn_2Fe$ powder and 0.45 g (15 wt %) of carbon black (SuperP, MMM carbon, Belgium) powder, and then mechanically milling the mixture in an argon atmosphere for 20 hours, at 600 rpm, by using the shaker-type ball mill device.

Preparation of Negative Electrode and Lithium Battery

Example 1

A mixed power was obtained by mechanically stirring 80 wt % of the composite negative electrode active material powder prepared in Preparation Example 1 and 20 wt % of Cu powder (99.9%, Kojundo Chemical Laboratory, Japan) having an average particle size of 75 μl, for 30 minutes.

A slurry was prepared by mixing 70 wt % of the mixed powder, 15 wt % of graphite powder (SFG6, Timcal, Swiss), and 15 wt % of PVDF in an agate mortar, with about 10 times as much of the NMP with respect to a weight ratio of the amount of the PVDF. The slurry was coated on a copper foil to a thickness of about 150 μm, using a doctor blade, dried for 2 hours at the room temperature, and then again dried in vacuum at 120° C., for 2 hours, to prepare a negative electrode plate.

A CR-2016 standard coin cell was prepared using the negative electrode plate, using lithium as a counter electrode, a propylene separator (Celgard® 3501) as a separator, and a solution obtained by dissolving 1M $LiPF_6$ in ethylene carbonate (EC) and diethylene carbonate (DEC) having a weight ratio of 1:1, as an electrolyte.

Example 2

A negative electrode and a lithium battery were prepared in the same manner as in Example 1, except that the negative electrode active material prepared in Preparation Example 2 was used instead of the negative electrode active material prepared in Preparation Example 1.

Example 3

A negative electrode and a lithium battery were prepared in the same manner as in Example 1, except that 90 wt % of the composite negative electrode active material powder prepared in Preparation Example 2 and 10 wt % of Cu powder (99%, Aldrich, USA) having an average particle size of 10 μm were used.

Comparative Example 1

A negative electrode and a lithium battery were prepared in the same manner as in Example 1, except that Cu powder was not used.

Comparative Example 2

A negative electrode and a lithium battery were prepared in the same manner as in Example 2, except that Cu powder was not used.

Comparative Example 3

A negative electrode and a lithium battery were prepared in the same manner as in Example 2, except that 90 wt % of the composite negative electrode active material powder prepared in Preparation Example 2 and 10 wt % of Cu powder (99.5%, Germankorea, South Korea) having an average particle size of 0.1 μm were used.

Comparative Example 4

A negative electrode and a lithium battery were prepared in the same manner as in Example 1, except that 90 wt % of the composite negative electrode active material powder prepared in Preparation Example 2 and 10 wt % of Cu powder (99.7%, Aldrich, USA) having an average particle size of 3 μm were used.

Evaluation Example 1

Charging and Discharging Test

Lithium batteries prepared according to Examples 1 through 3 and Comparative Examples 1 through 4 were charged until a voltage reached 0.001 V (vs. Li), with a current of 50 mA per 1 g of the negative electrode active material, and were discharged with the same current until the voltage reached 1.5 V (vs. Li). Then, the charging and discharging were repeated 40 times. The results of the charging and discharging test are shown in Table 1. The capacity retention ratio is defined by Equation 1 below.

Capacity Retention Ratio at $40^{th}$ Cycle [%]=Discharge Capacity at $40^{th}$ Cycle/Discharge Capacity at $1^{st}$ Cycle     [Equation 1]

TABLE 1

| | Initial Capacity [mAh/g] | Capacity Retention Ratio at $40^{th}$ Cycle [%] |
|---|---|---|
| Example 1 | 591 | 85.1 |
| Example 2 | 608 | 91.5 |
| Example 3 | 597 | 87.5 |
| Comparative Example 1 | 585 | 73.3 |
| Comparative Example 2 | 665 | 30.7 |
| Comparative Example 3 | 587 | 57.5 |
| Comparative Example 4 | 592 | 61.1 |

As shown in Table 1, the lithium batteries of Examples 1 through 3 showed a high initial capacity. Also, the lithium batteries of Examples 1 through 3 had remarkably improved capacity retention ratios, as compared to the lithium batteries of Comparative Examples 1 through 4.

As described above, according to one or more of the above exemplary embodiments, a capacity retention ratio of a lithium battery may be improved by including composite negative electrode active material particles including Sn, and conductive metal particles.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A negative electrode comprising:
   a current collector; and
   a negative electrode active material layer disposed on the current collector, comprising:
      composite negative electrode active material particles comprising Sn; and
      conductive metal particles,
   wherein the conductive metal particles form an intermetallic compound with the Sn, and an average particle size of the conductive metal particles is in a range of 10 to 100 μm.

2. The negative electrode of claim 1, wherein the conductive metal is at least one selected from Cu, Ni, Co, and Fe.

3. A lithium battery employing the negative electrode of claim 2.

4. The negative electrode of claim 1, wherein the composite negative electrode active material particles further include at least one material selected from carbon and a transition metal.

5. A lithium battery employing the negative electrode of claim 4.

6. The negative electrode of claim 4, wherein the transition metal is at least one metal selected from Fe, Co, Ni, Cu, Ti, V, Nb, Mo, Sb, and W.

7. A lithium battery employing the negative electrode of claim 6.

8. The negative electrode of claim 1, wherein the composite negative electrode active material particles include at least one material selected from Sn—C, Sn-M, and Sn-M-C, wherein M is a transition metal.

9. A lithium battery employing the negative electrode of claim 8.

10. The negative electrode of claim 1, wherein the composite negative electrode active material particles include at least one material selected from $Sn_2Fe$, $Sn_2Fe$—C, $Sn_2Co$, $Sn_2Co$—C, $Sn_2Mn$, $Sn_2Ni_3$, $Sn_4Ni_3$, SnSb, and $Sn_3Sb_2$.

11. A lithium battery employing the negative electrode of claim 10.

12. The negative electrode of claim 1, wherein a weight ratio of the composite negative electrode active material particles to the conductive metal particles is in the range of 95:5 to 70:30.

13. A lithium battery employing the negative electrode of claim 1.

14. A method of preparing a negative electrode, the method comprising:

preparing composite negative electrode active material particles by combining a Sn powder with at least one of a transition metal powder and a carbon power, the transition metal powder being of a transition metal other than Sn, mixing the composite negative electrode active material particles and conductive metal particles, wherein an average particle size of the conductive metal particles is in a range of 10 to 100 μm.

15. The method of claim 14, wherein the conductive metal particles include at least one metal selected from Cu, Ni, Co, and Fe.

16. The method of claim 14, wherein the composite negative electrode active material particles include at least one material selected from Sn—C, Sn-M, and Sn-M-C, wherein M is the transition metal other than Sn.

17. The method of claim 16, wherein the Sn-M-C is prepared by mechanically milling a Sn-M composite with a carbon-based material, for less than about 40 hours.

* * * * *